United States Patent
Filippo et al.

(10) Patent No.: US 10,289,417 B2
(45) Date of Patent: May 14, 2019

(54) BRANCH PREDICTION SUPPRESSION FOR BLOCKS OF INSTRUCTIONS PREDICTED TO NOT INCLUDE A BRANCH INSTRUCTION

(71) Applicant: ARM LIMITED, Cambridge (GB)

(72) Inventors: Michael Alan Filippo, Austin, TX (US); Matthew Paul Elwood, Austin, TX (US); Umar Farooq, Austin, TX (US); Adam George, Austin, TX (US)

(73) Assignee: ARM Limited, Cambridge (GB)

( * ) Notice: Subject to any disclaimer, the term of this patent is extended or adjusted under 35 U.S.C. 154(b) by 715 days.

(21) Appl. No.: 14/519,697

(22) Filed: Oct. 21, 2014

(65) Prior Publication Data

US 2016/0110202 A1    Apr. 21, 2016

(51) Int. Cl.
*G06F 9/30* (2018.01)
*G06F 9/38* (2018.01)

(52) U.S. Cl.
CPC .......... *G06F 9/3844* (2013.01); *G06F 9/3806* (2013.01); *G06F 9/3848* (2013.01)

(58) Field of Classification Search
CPC ..... G06F 1/3287; G06F 9/3806; G06F 9/3844
See application file for complete search history.

(56) References Cited

U.S. PATENT DOCUMENTS

| | | | | |
|---|---|---|---|---|
| 5,506,976 A * | 4/1996 | Jaggar | ................... | G06F 9/3844 711/137 |
| 7,681,021 B2 * | 3/2010 | Schuler | ................. | G06F 9/3806 712/238 |
| 2005/0235170 A1 | 10/2005 | Atkinson | | |
| 2007/0130450 A1 * | 6/2007 | Chiao | ................... | G06F 9/3802 712/239 |
| 2009/0055635 A1 | 2/2009 | Tani | | |
| 2013/0339693 A1 * | 12/2013 | Bonanno | ............... | G06F 9/3806 712/238 |
| 2015/0169041 A1 * | 6/2015 | Blasco | .................. | G06F 1/3293 713/320 |

FOREIGN PATENT DOCUMENTS

EP    2 648 090    10/2013

OTHER PUBLICATIONS

UK Combined Search and Examination Report dated Mar. 10, 2016 issued in GB 1515659.9, 7 pages.
IP.com, "Method and Apparatus for Predicted Prefetch Suppression" Sep. 14, 2010, 3 pages.

* cited by examiner

*Primary Examiner* — David J. Huisman
(74) *Attorney, Agent, or Firm* — Nixon & Vanderhye P.E.

(57) ABSTRACT

A data processing apparatus contains branch prediction circuitry including a micro branch target buffer, a full branch target buffer and a global history buffer. The branch target buffer entries contain history data which indicates whether or not a number of the following blocks of program instructions, subsequent to and sequential to a block of program instruction identified by that branch target buffer entry containing a branch instruction, do themselves contain any branch instructions. If the history data indicates that the following blocks of program instructions do not contain branches, then the operation of the branch prediction circuitry is suppressed for these following blocks of program instructions so as to save energy.

12 Claims, 4 Drawing Sheets

BRANCH PREDICTION SUPPRESSION FOR BLOCKS OF INSTRUCTIONS PREDICTED TO NOT INCLUDE A BRANCH INSTRUCTION

BACKGROUND

This disclosure relates to data processing systems. More particularly, this disclosure relates to branch prediction mechanisms within data processing systems.

It is known to provide data processing systems which include branch prediction mechanisms seeking to predict when branch instructions will be encountered within a program stream and accordingly direct, for example, the prefetch operations and the instruction issue operations so that branch instructions will not result in unnecessary program instruction fetching or incorrect program instructions being issued into an instruction pipeline. The speed and efficiency advantages associated with branch prediction mechanisms justify the resources being dedicated to those branch prediction mechanisms. Accordingly, in an effort to increase the accuracy of branch prediction mechanisms, these have become increasingly sophisticated and in themselves represent a significant overhead in terms of circuit overhead and energy use.

SUMMARY

Viewed from one aspect the present disclosure provides apparatus comprising:

one or more branch prediction circuits to predict whether a given block of program instructions contains a branch instruction; and prediction suppression circuitry to use history data representing previous branch behaviour of a following block of program instructions sequentially following said given block of program instructions to suppress at least one of said one or more branch prediction circuits predicting whether said following block of program instructions contains a branch instruction.

The present disclosure recognises that it is possible to predict whether or not program instructions following a branch instruction will themselves contain branch instructions based upon the past behaviour of the system. Accordingly, when a branch instruction is predicted, it is possible to predict whether a region of following program instructions will contain a branch. If the prediction is that the following region of program instructions will not contain a branch, then the operation of at least some of the branch prediction circuits can be suppressed for that region of program instructions, thereby reducing energy consumption.

Viewed from another aspect the present disclosure provides apparatus comprising:

one or more branch prediction means for predicting whether a given block of program instructions contains a branch instruction; and prediction suppression means for using history data representing previous branch behaviour of a following block of program instructions sequentially following said given block of program instructions to suppress at least one of said one or more branch prediction means predicting whether said following block of program instructions contains a branch instruction.

Viewed from another aspect the present disclosure provides a method comprising the steps of:

predicting with one or more branch prediction circuits whether a given block of program instructions contains a branch instruction; and using history data representing previous branch behaviour of a following block of program instructions sequentially following said given block of program instructions to suppress at least one of said one or more branch prediction means predicting whether said following block of program instructions contains a branch instruction.

Example embodiments of the disclosure will now be described, by way of example only, with reference to the accompanying drawings in which:

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
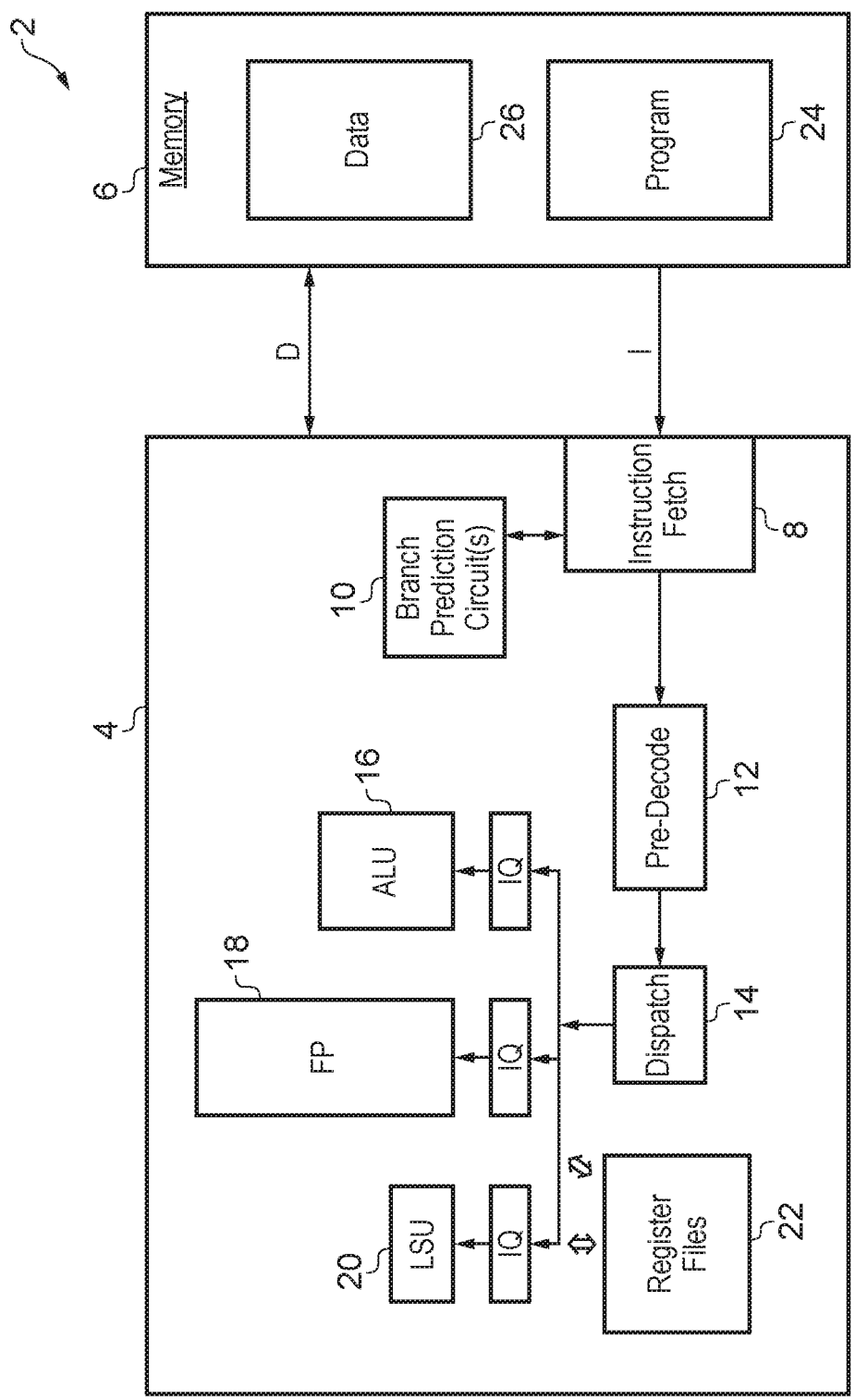
FIG. 1 schematically illustrates a data processing system including branch prediction mechanisms.

The present techniques may, for example, be used to suppress branch prediction by at least some of the branch prediction circuitry in the block or blocks of program instructions immediately following a block of program instructions in which a predicted branch has been identified. The suppression of prediction could however extend beyond the immediately following block of program instructions for a number of blocks of program instructions in relation to which history data has been collected to indicate whether or not they contain branches.

In at least some embodiments, it has been found that a good balance between the savings achieved by prediction suppression, weighed against the overhead associated with collecting and maintaining history data, is achieved when prediction suppression is performed in dependence upon history data for the two following blocks of program instructions subsequent to a block of program instructions in which a predicted branch is identified. The history data could extend over a different number of blocks.

In the context of systems in which the history data relates to a plurality of blocks of program instructions following a block of program instructions in which a predicted branch has been identified, the history data may have the form of a count of following blocks of program instructions which are predicted not to contain a branch. This provides a compact representation of the history information.

While it will be appreciated that the branch prediction circuits can have a wide variety of different forms familiar to those in this technical field, one particular form of branch prediction circuitry to which the present techniques may be readily applied are when the one or more branch prediction circuits comprise at least one branch target buffer to store branch target data specifying addresses blocks of program instructions predicted to contain a branch instruction. Large branch target buffers can consume a considerable amount of energy in performing their lookup operations and accordingly if these can be suppressed when they are necessary, then an energy saving can be achieved. Furthermore, branch target buffers are well suited to additionally store the history data for the branch prediction suppression as part of the branch target data, or at least associated therewith.

In some example embodiments, the one or more branch prediction circuits may include a micro branch target buffer and a full branch target buffer. A micro branch target buffer is quicker in operation than the full branch target buffer, but the full branch target buffer is able to store branch target data in respect of more blocks of program instructions. In combination, these two types of branch target buffer can be used with the micro branch target buffer storing branches which occur at high frequency, and accordingly gain most advantage from rapid identification, with the full branch target buffer providing backstop operation for a larger set of known branches with their branch targets.

In some embodiments the prediction suppression circuitry may be controlled by the micro branch target buffer and used to suppress branch prediction by the full branch target buffer. The rapid operation of the micro branch target buffer allows associated history data to be identified relatively rapidly and accordingly gain good advantage from early suppression of the action of other of the one or more branch prediction circuits, including the full branch target buffer.

The history data, which has been obtained by observing the operation of the data processing system, may be stored within either or both of a micro branch target buffer and a full branch target buffer. In this way, as branch targets are swapped between the micro branch target buffer and the full branch target buffer, their history data is preserved so as to be available to suppress unnecessary branch prediction operations as required.

The branch target buffer, e.g. in the case of the micro branch target buffer, may use the history data to suppress its own prediction operation in order to gain additional energy saving.

It will be appreciated that the branch prediction circuitry can have a wide variety of different forms as mentioned above. Another form of branch prediction circuitry which can be used with advantage in the context of the present techniques is a global history buffer used to predict taken and not taken behaviour of branch instructions. Such a global history buffer consumes energy and accordingly the present technique, which can suppress prediction by the global history buffer when it is unnecessary, can yield an advantage.

It will be appreciated that the blocks of program instructions could have a variety of different forms. In some example embodiments, a block of program instructions may contain a single program instruction. In other example embodiments, a block of program instructions and a following block of program instructions may each contain a plurality of program instructions. The blocks of program instructions may be selected to have a size and alignment matching, for example, an instruction cache memory provided within the system, as instruction prefetches are typically performed on the basis of whole cache lines.

The relationship between the given block of program instructions and the history data associated therewith to suppress prediction of following blocks of program instructions can vary. However, at least some embodiments of the present disclosure are ones in which the given block of program instructions is a branch-containing block of program instructions which are predicted by the one or more prediction circuits to contain a branch. Accordingly, the history data relates to blocks of program instructions immediately following blocks of program instructions which are branch-containing blocks of program instructions.

In order to generate the history data used to control the prediction suppression, some embodiments of the present disclosure include history data generating circuitry to monitor if a block of program instructions following a branch-containing block of program instructions contains a branch, and to generate the history data accordingly.

FIG. 1 schematically illustrates a data processing system 2 including a processor 4 and a memory 6. The processor 4 includes instruction fetching circuitry 8, branch prediction circuitry 10, pre-decode circuitry 12 and dispatch circuitry 14. A plurality of instruction pipelines including an ALU pipeline 16, a floating point pipeline 18, and a load store unit pipeline 20 are provided to receive and process instructions from the dispatch unit 14. Register files 22 are provided to store source and destination operand data in both speculative and architectural form, as will be familiar to those in this technical field.

The memory 6 contains both program instructions 24 and data 26 to be manipulated. The program instructions 24 are fetched as blocks of program instructions by the instruction fetch circuitry 8. In practice, an instruction cache may be provided and the blocks of program instructions may correspond to a cache line of program instructions. The branch prediction circuitry 10 contains a plurality of branch prediction mechanisms, including a micro branch target buffer, a full branch target buffer, a global history buffer and potentially further prediction mechanisms, such as indirect prediction mechanisms and stack return address prediction circuitry as will be familiar to those in the technical field.

The branch prediction circuitry 10 serves to steer the instruction fetch circuitry 8 to fetch program instructions corresponding to the predicted path of the program through those program instructions, including any branches. The past behaviour of the system when traversing the program instructions is observed and used to build up the state data within the branch prediction circuitry 10 which controls the predictions it performs. The fetched instructions may be supplied to the decoding circuitry 12 in the order in which they are predicted to be followed, taking into account the previous branch behaviour of the program instruction stream. The dispatch unit 14 then dispatches the program instructions to instruction queues (IQs) associated with each of the processing pipelines 16, 18, 20 where they await issue. The dispatch unit 14 dispatches the program instructions to the issue queues when their source operands are available within the register files 22.

It will be appreciated that the energy and time consumed in the processing pipelines(s) downstream of the instruction fetch unit 8, as well as the energy consumed in fetching program instructions from the memory 6, has the consequence that a branch misprediction introduces a significant processing performance and energy cost. Accordingly, the branch prediction circuitry 10 will often be large and consume a relatively large amount of energy in order to seek to improve the branch prediction accuracy so as to avoid the penalties associated with branch misprediction. Whilst sophisticated branch prediction circuitry 10 may reduce the rate of branch misprediction, it has the disadvantage of consuming considerable energy in its own right.

Figure 2:
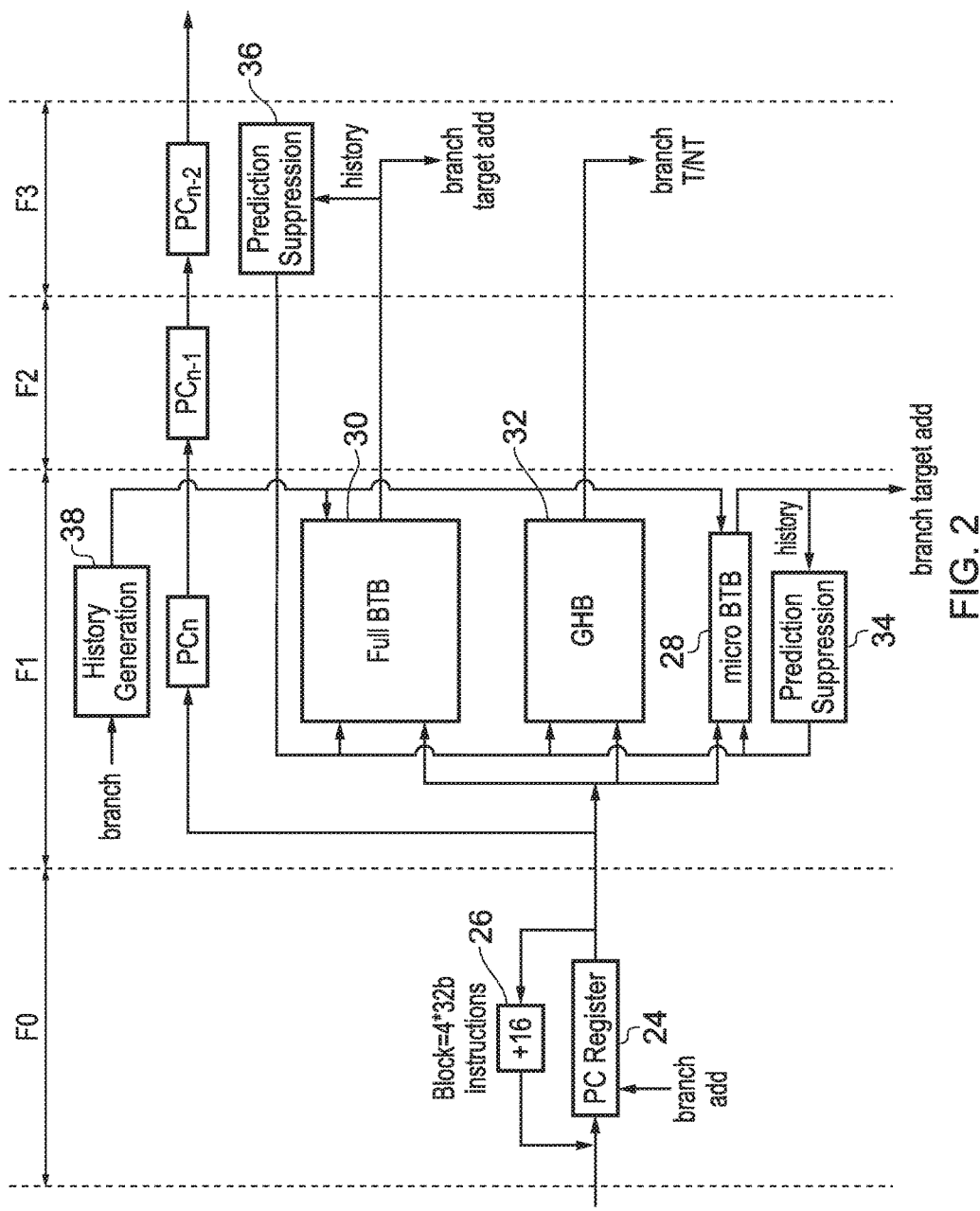
FIG. 2 schematically illustrates branch prediction mechanisms in the context of an instruction fetch pipeline of a data processing system.

FIG. 2 schematically illustrates the branch prediction circuitry 10 in the context of the instruction fetch unit 8. The instruction fetch unit 8 operates over a plurality of fetch cycles to fetch instructions from an instruction address held in a program counter register 24 which is incremented by values of +16 by an incrementor 26 so as to sequentially fetch blocks of program instructions each containing four 32-bit instructions when no branches are encountered. When a branch is encountered, then the branch target address is inserted into the program counter register 24 and prefetching of blocks of program instructions starting from the branch target address is started.

The fetch stage F1 in which the program counter address of the next block of program instructions to be fetched is known is used to initiate the branch prediction operations performed by the branch prediction circuitry 10. The branch prediction circuitry 10 includes a micro branch target buffer 28, a full branch target buffer 30 and a global history buffer 32. Prediction suppression circuitry 34 is associated with the micro branch target buffer 28, and prediction suppression circuitry 36 is associated with the full branch target buffer 30. As illustrated, the micro branch target buffer 28 is relatively fast in its operation and so is able to identify a given block of program instructions specified by a program counter value as a branch-containing block of program instructions within the fetch stage F1. At this time, the micro branch target buffer 28 produces its branch target address which is fed back to the program counter register 24 as well as supplying the history data which is associated with that branch target address. The history data is supplied to the prediction suppression circuitry 34 where it is used to selectively suppress the prediction operation by each of the micro branch target buffer 28, the full branch target buffer 30 and the global history buffer 32 in up to the two fetch cycles corresponding to the next two blocks of program instructions to be fetched. More generally, in other example embodiments, the suppression of prediction operation could be performed over multiple following fetch cycles, e.g. two, three or more depending upon the particular embodiment. These are the following two blocks of program instructions after the branch-containing block of program instructions which was identified by the micro branch target buffer 28. The history data is read by the prediction suppression circuitry 34 and serves to trigger the prediction suppression circuitry to suppress one of a run of zero, one or two of the following blocks of program instructions to have no branch prediction performed thereon (if the history data indicates the following blocks do not contain any branch instructions).

It will be appreciated that the micro branch target buffer 28 contains relatively few entries, and accordingly it is possible that a branch-containing block of program instructions will not be identified by the micro branch target buffer 28, but will be identified by the full branch target buffer 30 which contains a larger number of branch target buffer entries and a larger amount of branch target data. The full branch target buffer 30 identifies a branch target in the fetch stage F3 and at the same time supplies this data to its own prediction suppression circuitry 36. In a similar manner as discussed above, the prediction suppression circuitry 36 serves to suppress prediction of branches for zero, one or two following blocks of program instructions.

History generation circuitry 38 is responsive to detection of a branch instruction to trigger an entry to be stored in one of the micro branch target buffer 28 and the full branch target buffer 30. The history generation circuitry 38 also monitors whether or not the blocks of program instructions sequentially following the branch-containing block of program instructions for which an entry has just been made (or is being maintained), themselves contain a branch. If the following blocks of program instructions in the sequence do not contain a branch, then respective first and second no-branch flags are set within the branch target buffer entry for the branch-containing block of program instructions for which subsequent branch behaviour is being tracked.

The global history buffer 32 serves to maintain a history of taken T and not taken NT behaviour for branch instructions encountered within the program stream and this can be used to steer branch prediction behaviour in a more sophisticated manner seeking to improve branch prediction in situations where branches are not always followed, but do have some pattern in the way in which they are followed that can be predicted. The action of the global history buffer 32 may also be suppressed. Other forms of branch prediction mechanism which can have their operation suppress include indirect prediction circuitry and stack register return prediction circuitry as will be familiar to those in this technical field.

Figure 3:
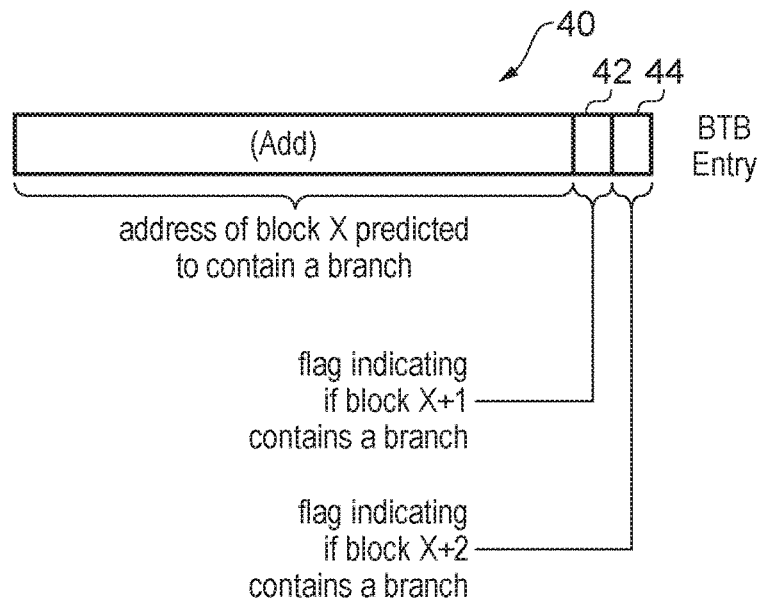
FIG. 3 schematically illustrates a branch target buffer entry including flags indicating whether blocks of program instructions following a predicted branch containing block themselves contain a branch.

FIG. 3 schematically illustrates a branch target buffer entry 40. This includes an address of a block of program instructions associated with an address X which is predicted to contain a branch as a branch has previously been observed within that block of program instructions. Associated with the branch target buffer entry 40 is a first no branch flag 42 indicating if a next block of program instructions at block address X+1 was observed as containing a branch. A second no-branch flag 44 indicates if a further following block of program instructions at block address X+2 was observed as containing a branch. The blocks of program instructions referred to by the branch target buffer entry 40 are sequential blocks of program instructions. It has been observed that in at least some embodiments, the branch behaviour of following blocks of program instructions can be well predicted for up to two following blocks of program instructions subsequent to a branch-containing block of program instructions.

Figure 4:
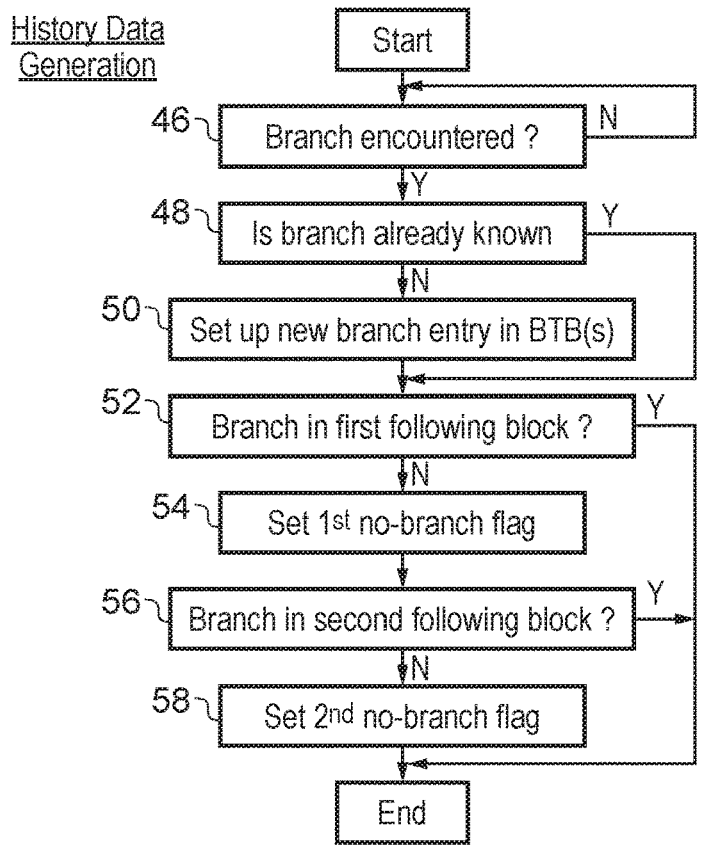
FIG. 4 is a flow diagram schematically illustrating history data generation.

FIG. 4 is a flow diagram schematically illustrating history data generation by the history generation circuitry 38. At step 46 processing waits until a branch is encountered. Step 48 then determines whether or not the branch encountered is one which has previously been encountered. If the branch encountered has not previously been encountered, then step 50 serves to set up a new branch entry within the branch target buffers 28, 30 as appropriate. If the branch has already been encountered, then step 50 is bypassed.

At step 52 a determination is made as to whether there is any branch present in the first following instruction block subsequent to the block in which the branch encountered at step 46 was detected. If there is no branch in this first following block, then step 54 serves to set the first no-branch flag 42 within the branch target buffer entry 40 for the branch encountered at step 46. If there was a branch in the first following block as determined at step 52, then the processing terminates.

At step 56 a determination is made as to whether or not a branch is present within the second following block subsequent to the block containing the branch countered at step 46. If there is no branch in the second following block, then step 58 serves to set the second no-branch flag 44 prior to processing terminating. If there is a branch in the second following block as determined at step 56, then step 58 is bypassed.

Figure 5:
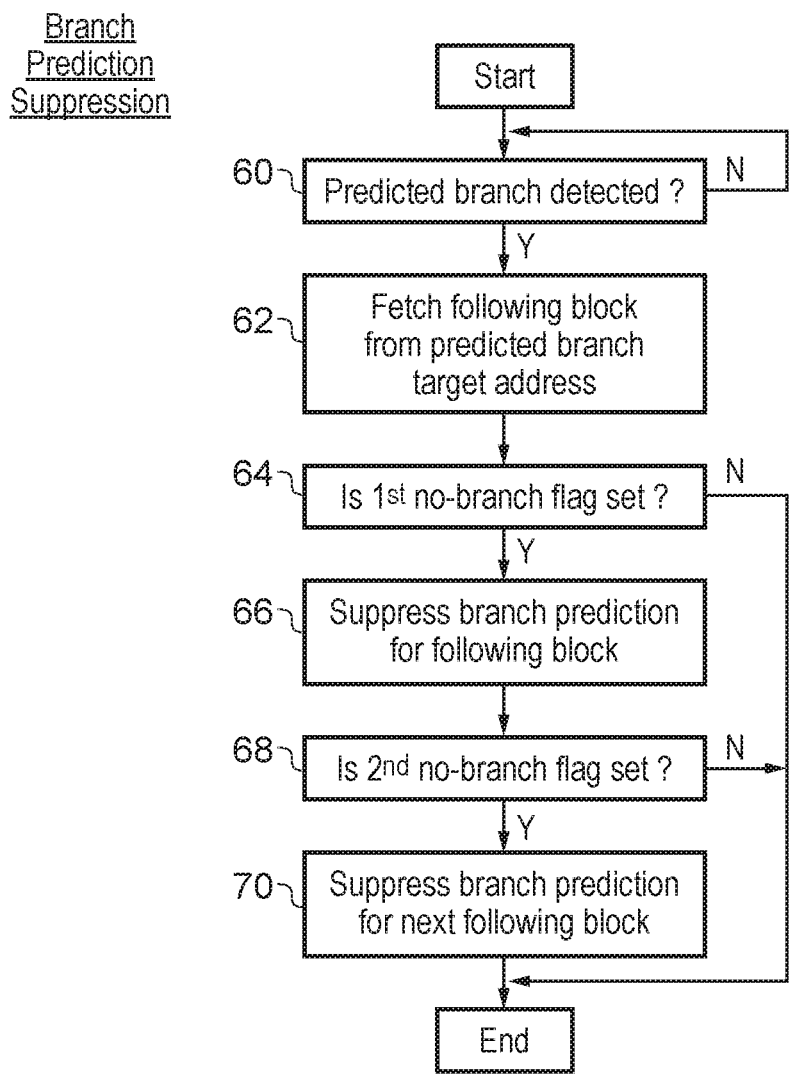
FIG. 5 is a flow diagram schematically illustrating branch prediction suppression.

FIG. 5 is a flow diagram schematically illustrating branch prediction suppression. At step 60 processing waits until a predicted branch is detected. Step 62 then fetches the following block from the predicted branch target address. The predicted branch target address is obtained from one of the branch target buffers 28, 30. The branch target buffer entry for the branch detected at step 60 is then read to determine whether the first no-branch flag 42 is set during the step 64. If the first no-branch flag is not set, then the branch prediction suppression processing terminates. If the first no-branch flag 42 is set, then step 66 serves to suppress branch prediction for the following block of program instructions. Accordingly, operation is suppressed for one or more of the micro branch target buffer 28, the full branch target buffer 30 and the global history buffer 32 (or other prediction mechanisms/circuits). In practice, in some example embodiments, most energy saving may be achieved by suppressing the prediction operation of the large structures which are the full branch target buffer 30 and the global history buffer 32. Additional benefit may also be gained by suppressing the operation of the micro branch target buffer 28.

Following step 66, step 68 serves to determine whether or not the second no-branch flag 44 is set. If the second no-branch flag 44 is not set, then the branch prediction suppression processing again terminates. If the second no-branch flag 44 is set, then step 70 serves to suppress the branch prediction for the next following block of program instructions. Thus, the operation of FIG. 5 serves to suppress zero, one or two following blocks of program instructions subsequent to a given block of program instructions which is detected as a branch-containing block of program instructions. This suppression is performed based upon history data comprising, in this example embodiment, the first no-branch flag data 42 and the second no-branch flag data 44 from the branch target buffer entry 40.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. Apparatus comprising:
    one or more branch prediction circuits to predict whether a given block of program instructions contains a branch instruction; and
    prediction suppression circuitry to use history data representing previous branch behaviour of a following block of program instructions sequentially following said given block of program instructions to suppress at least one of said one or more branch prediction circuits predicting whether said following block of program instructions contains a branch instruction,
    wherein said one or more branch prediction circuits comprise at least one branch target buffer to store branch target data specifying addresses of blocks of program instructions predicted to contain a branch;
    wherein said at least one branch target buffer comprises a micro branch target buffer and a full branch target buffer, said micro branch target buffer to predict whether said given block of program instructions contains a branch more quickly than said full branch target buffer, and said full branch target buffer to store branch target data in respect of more blocks of program instructions than said micro branch target buffer; and
    wherein said prediction suppression circuitry is controlled by said micro branch target buffer and uses said history data to suppress said full branch target buffer predicting if said following block of program instructions contains a branch.

2. Apparatus as claimed in claim 1, wherein said history data represents previous branch behaviour of a plurality of following blocks of program instructions sequentially following said given block and said prediction suppression circuitry uses history data to suppress at least one of said one or more branch prediction circuits predicting if one or more of said plurality of following blocks of program instructions contain a branch.

3. Apparatus as claimed in claim 2, wherein said plurality of following blocks of program instructions comprises two following blocks of program instructions.

4. Apparatus as claimed in claim 1, wherein said history data comprises a count of following blocks of program instructions predicted not to contain a branch.

5. Apparatus as claimed in claim 1, wherein said history data is part of branch target data.

6. Apparatus as claimed in claim 1, wherein both said micro branch target buffer and said full branch target buffer store at least some of said history data.

7. Apparatus as claimed in claim 1, wherein said at least one branch target buffer uses said history data to control said prediction suppression circuitry to suppress said at least one branch target buffer itself predicting if said following block of program instructions contains a branch.

8. Apparatus as claimed in claim 1, wherein said one or more branch prediction circuits include a global history buffer to predict taken and not taken behaviour of branch instructions and said prediction suppression circuitry uses said history data to suppress said global history buffer predicting if said following block of program instructions contains a branch.

9. Apparatus as claimed in claim 1, wherein said given block of program instructions and said following block of program instructions each contain a plurality of program instructions.

10. Apparatus as claimed in claim 1, wherein said given block of program instructions is a branch-containing block of program instructions predicted by said one or more prediction circuits to contain a branch.

11. Apparatus as claimed in claim 10, comprising history data generating circuitry to monitor if a block of program instructions following said branch-containing block of program instructions contains a branch and to generate said history data indicating if said block of program instructions following said branch-containing block of program instructions contains a branch.

12. Apparatus comprising:
    one or more branch prediction means for predicting whether a given block of program instructions contains a branch instruction; and
    prediction suppression means for using history data representing previous branch behaviour of a following block of program instructions sequentially following said given block of program instructions to suppress at least one of said one or more branch prediction means predicting whether said following block of program instructions contains a branch instruction,
    wherein said one or more branch prediction means comprise at least one branch target buffer means for storing branch target data specifying addresses of blocks of program instructions predicted to contain a branch;
    wherein said at least one branch target buffer means comprises a micro branch target buffer means and a full branch target buffer means, said micro branch target buffer means for predicting whether said given block of program instructions contains a branch more quickly than said full branch target buffer means, and said full branch target buffer means for storing branch target data in respect of more blocks of program instructions than said micro branch target buffer means; and said micro branch target buffer means is also for controlling said prediction suppression means; and said prediction suppression means is also for using said history data to suppress said full branch target buffer means from predicting if said following block of program instructions contains a branch.

\* \* \* \* \*